(12) United States Patent
Liess

(10) Patent No.: US 7,619,744 B2
(45) Date of Patent: Nov. 17, 2009

(54) MOVEMENT SENSOR

(75) Inventor: Martin Dieter Liess, Wiesbaden (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 429 days.

(21) Appl. No.: 11/568,410

(22) PCT Filed: Apr. 26, 2005

(86) PCT No.: PCT/IB2005/051357

§ 371 (c)(1), (2), (4) Date: Oct. 27, 2006

(87) PCT Pub. No.: WO2005/106634

PCT Pub. Date: Oct. 11, 2005

(65) Prior Publication Data

US 2007/0206180 A1   Sep. 6, 2007

(30) Foreign Application Priority Data

Apr. 29, 2004   (EP) ................... 04101847

(51) Int. Cl.
G01B 11/02 (2006.01)
(52) U.S. Cl. .................................... 356/498
(58) Field of Classification Search ................ 356/470, 356/498, 505, 506, 519, 496, 429–431
See application file for complete search history.

(56) References Cited

U.S. PATENT DOCUMENTS

| | | | | |
|---|---|---|---|---|
| 4,005,936 A * | 2/1977 | Redman et al. | ............... | 356/4.1 |
| 4,856,893 A * | 8/1989 | Breen | ......................... | 356/5.09 |
| 5,082,364 A * | 1/1992 | Russell | ...................... | 356/5.15 |
| 6,233,045 B1 * | 5/2001 | Suni et al. | ................... | 356/28.5 |
| 6,781,677 B1 * | 8/2004 | Muenter et al. | ............ | 356/5.05 |
| 2003/0016365 A1 * | 1/2003 | Liess et al. | ................... | 356/498 |
| 2007/0165130 A1 * | 7/2007 | Cobben et al. | ............... | 348/335 |

FOREIGN PATENT DOCUMENTS

| | | | |
|---|---|---|---|
| WO | 0237124 A1 | 5/2002 | |
| WO | 0237410 A1 | 5/2002 | |

OTHER PUBLICATIONS

Czarske, et al., "Mode-locking external-cavity laser-diode sensor for displacement measurements of technical surfaces," Sep. 1, 2005, Applied Optics, vol. 44, No. 25, pp. 5180-5189.*

(Continued)

*Primary Examiner*—Patrick J Connolly
*Assistant Examiner*—Scott M Richey

(57) ABSTRACT

In an apparatus for handling sheet material or an optical input device, for example, which employs a relative movement sensor (108) utilizing the so-called "self-mixing" effect of a laser diode, a band pass filter (100) is provided for filtering the electric signal resulting from measurement of the electric signal to reduce or substantially eliminate the effects of both the low frequency carrier signal and the high frequency noise present in such a signal. As a result, the precision of the laser self-mixing translation measurements is significantly improved.

14 Claims, 7 Drawing Sheets

OTHER PUBLICATIONS

Eiji Nakamura, et al: Development of Electrophoretic Display Using Microcapsulated Suspension, May 1998, pp. 1014-1017, XP002114866.

Shigenobu Shiniohara, et al: Compact and Versatile Self-Mixing Type Semiconductor Laser Doppler Velocimeters with Direction-Discrimination Circuit, IEEE vol. 38, No. 2, pp. 574-577, Apr. 1, 1989, XP000097229 ISSN: 0018-9456.

James H. Churnside, et al: Signal-to-Noise in a Backscatter-Modeled Doppler Velocimeter, The Institution of Electrical Engineers, Stevenage, GB; Applied Optics, vol. 23, No. 13, Jul. 1, 1984, pp. 2097-2106, XP8049592, ISSN: 0003-6935.

Applied Optics, vol. 31, No. 8, Jun. 20, 1992, pp. 3401-3408.

* cited by examiner

MOVEMENT SENSOR

CROSS REFERENCE TO RELATED APPLICATION

This application claims the benefit of European provisional application serial no. 04101847.4, filed Apr. 29, 2004, which the entire subject matter is incorporated herein by reference.

This invention relates to a relative movement sensor for measuring movement of an object and said sensor relative to each other, the sensor comprising at least one laser, having a laser cavity, for generating a measuring beam and illuminating an object therewith, wherein at least some of the measuring beam radiation reflected by said object re-enters said laser cavity, the apparatus further comprising measuring means for measuring changes in operation of said laser cavity caused by interference of reflected measuring beam radiation re-entering said laser cavity and the optical wave in said laser cavity, means for providing an electric signal representative of said changes.

A relative movement sensor of this type is disclosed in International Patent Application No. WO 02/37410 which describes an optical input device having a transparent window on which radiation from a diode laser is converged. As an object, for example, a user's finger, moves across the window, part of the radiation scattered by the object whose frequency is Doppler-shifted due to the movement of the object, re-enters the laser cavity. Relative movement of the input device and the object is measured using the so-called self-mixing effect in a diode laser. This is the phenomenon that radiation emitted by the diode laser and re-entering the cavity of the diode laser induces a variation in gain of the laser and thus in the radiation emitted by the laser. This change can be detected by a photo-diode which converts the radiation variation into an electric signal and electronic circuitry is provided which processes the signal.

Another relative movement sensor of the above-mentioned type is disclosed in International Patent Application No. WO 02/37124 which describes a method and device for measuring movement of a sheet of material and a sheet sensor relative to each other, whereby radiation from a diode laser is converged on the sheet, which reflects and scatters it. A part of the radiation beam is scattered along itself and this part is converged by a lens on the emitting surface of the diode laser and re-enters the cavity of this laser. Once again, measurement of the relative movement of the sheet material and sensor is achieved using the so-called self-mixing effect in the diode laser, as outlined above.

In either case, referring to FIG. 1 of the drawings, the signal generated during the translation measurement comprises a low frequency modulated carrier A, the information signal B in the form of a train of pulses, and some high frequency noise C. It will be appreciated by a person skilled in the art that it is the speckle pattern of the incident laser which influences the variation of amplitude of the undulating returned signal, each pulse corresponding to distance traveled, while the frequency of the pulses corresponds to the velocity of movement. However, as illustrated by FIG. 1 of the drawings, these pulses are often mixed with noise, which makes it difficult for the electronic circuitry to distinguish between pulses due to displacement and pulses due to noise, as illustrated more clearly with respect to FIG. 2 of the drawings. In particular, the high frequency noise causes jitter in the digitized signal such that the number of pulses cannot be precisely recovered and frequency determination with respect to the information signal becomes less accurate.

We have now devised an improved arrangement, and it is an object of the present invention to provide a relative movement sensor (and method of measuring relative movement) in which the precision of laser self-mixing translation measurements is significantly improved.

In accordance with the present invention, there is provided a relative movement sensor for measuring movement of an object and said sensor relative to each other, the sensor comprising at least one laser, having a laser cavity, for generating a measuring beam and illuminating an object therewith, wherein at least some of the measuring beam radiation reflected by said object re-enters said laser cavity, the apparatus further comprising measuring means for measuring changes in operation of said laser cavity caused by interference of reflected measuring beam radiation re-entering said laser cavity and the optical wave in said laser cavity, means for providing a first electric signal representative of said changes, band pass filter means for filtering said first electric signal so as to at least reduce the contribution thereto by low and high frequency noise to produce a second electric signal representative of said changes for use in determining relative movement of said object and said sensor.

Also in accordance with the present invention, there is provided a method for measuring movement of an object and a sensor relative to each other, the sensor comprising at least one laser, having a laser cavity, for generating a measuring beam and illuminating an object therewith, wherein at least some of the measuring beam radiation reflected by said object re-enters said laser cavity, the method further comprising measuring changes in operation of said laser cavity caused by interference of reflected measuring beam radiation re-entering said laser cavity and the optical wave in said laser cavity, providing a first electric signal representative of said changes, filtering said first electric signal so as to at least reduce the contribution thereto by low and high frequency noise to produce a second electric signal representative of said changes for use in determining relative movement of said object and said sensor The present invention further extends to a sheet sensor and apparatus for processing sheet material including such a sheet sensor, and to an input device, including a relative movement sensor as defined above.

Thus, in accordance with the invention, a band pass filter is provided which is intended to at least reduce, and in many cases substantially eliminate, the low frequency carrier and the high frequency noise, to leave only the desired undulating information signal.

The pass band of the band pass filter is preferably determined by the expected frequency of undulation of the first electric signal, the main dependent parameter of which is the highest speed of movement required to be detected because frequency is proportional to the speed of relative movement.

In one embodiment, the pass band of the band pass filter may be fixed. Alternatively, the pass band may be controllable, beneficially dynamically. For example, in an application where a motor or similar drive mechanism is employed to effect the above-mentioned relative movement, then the pass band of the band pass filter may be set and dynamically changed and controlled in accordance with the speed of the drive mechanism. This might be applicable in, for example, a printer or copier application.

In a first preferred embodiment of the invention, the low and high pass components of the pass band of the band pass filter may be created by, for example, respective ramp generators. The ramp generators are preferably arranged to receive one or more control signals from a motor controller, which controls a motor, such that the slope of the ramps generated by the ramp generators, and therefore the pass band of the band pass filter, is controlled dependent on the speed of the motor. Preferably, a pulse counter is used to determine from the second electric signal at least the extent of relative movement between the object and the sensor, and the arrangement beneficially comprises a feedback loop from the pulse counter to the motor and the sensor, via the motor controller.

A motor velocity sensor may be provided to sense the velocity of the motor and provide control signals to level generator means for generating the low and high pass components of the pass band of the band pass filter. A differentiator may be provided between the band pass filter and the pulse counter, and level generator means may also be provided for control of the differentiator, which level generator preferably also receives an input from the motor velocity sensor.

In an alternative embodiment, the arrangement may comprise a plurality of band pass filters, one of which is selected dependent upon the frequency of the first electric signal. Each of the band pass filters is beneficially provided with a respective rectifier and amplifier.

These and other aspects of the present invention will be apparent from, and elucidated with reference to, the embodiments described herein.

Embodiments of the present invention will now be described by way of examples only and with reference to the accompanying drawings, in which:

FIG. 7b is a plan view of the device of FIG. 7a;

Figure 3:
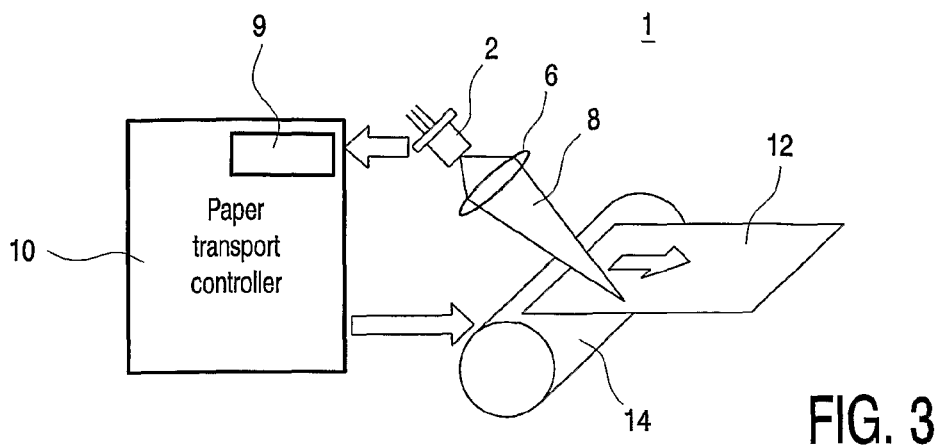
FIG. 3 is a schematic illustration of a self-mixing sheet sensor.

FIG. 3 shows a first and most simple embodiment of the self-mixing sheet sensor 1 as described in International Patent Application WO02/37124. This sensor comprises a diode laser, which may form part of a laser/diode unit 2, i.e. a unit comprising a diode laser and a detector in the form of a photo diode. Instead of such a unit also a separate diode laser and a separate photo diode may be used. The sensor further comprises a lens 6, which converges radiation emitted by the diode laser as a measuring beam 8 on a sheet 12 of, for example paper, which movement has to be controlled. This sheet is transported by means of a roller 14. The laser/diode unit and the lens may be accommodated in an optical module, which housing is provided with a window for the measuring beam. The sheet then moves across this window.

If a paper sheet is present in the path of the measuring beam 8, for example at the location of said window, this sheet reflects and scatters the beam 8. A part of the radiation of beam 8 is scattered along itself and this part is converged by the lens 6 on the emitting surface of the diode laser and re-enters the cavity of this laser. As will be explained hereinafter, the radiation returning in the cavity induces changes in this cavity, which results in, inter alia, a change of the intensity of the laser radiation emitted by the diode laser. This change can be detected by means of a photo diode, which converts the radiation variation into an electric signal, and an electronic circuit 9 for processing this signal. The circuit 9 forms part of a paper transport controller 10, that controls the rotation of the roller 14 and thus the movement of the sheet 12.

Figure 4:
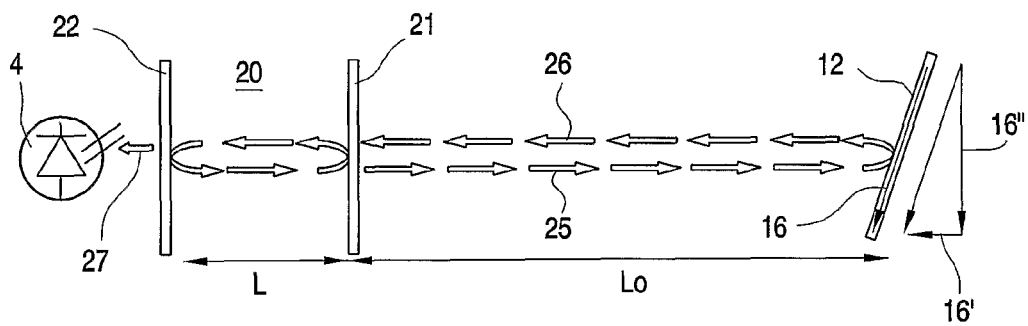
FIG. 4 illustrates the principle of the measuring method of the sensor of FIG. 3.

FIG. 4 shows the principle of the sheet sensor and the method of measuring as described in International Patent Application WO02/37124. In this figure, the diode laser 3 is schematically represented by its cavity 20 and its front and rear facets, or laser mirrors, 21 and 22, respectively. The cavity has a length L. The space between the sheet 12 and the front facet 21 forms an external cavity, which has a length $L_0$. The laser beam emitted through the front facet, i.e. the illumination beam, is denoted by the reference numeral 25 and the radiation reflected by the sheet in the direction of the front facet is denoted by reference numeral 26. Part of the radiation generated in the laser cavity passes through the rear facet and is captured by the photo diode 4.

If the sheet 12 moves in the direction of the illumination beam 25, the reflected radiation 26 undergoes a Doppler shift. This means that the frequency of this radiation changes or that a frequency shift occurs. This frequency shift is dependent on the velocity with which the sheet moves and is of the order of a few kHz to MHz. The frequency-shifted radiation re-entering the laser cavity interferes with the optical wave, i.e. the radiation, generated in this cavity 20. This means that a self-mixing effect occurs in this cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of the self-mixing effect and the Doppler shift causes a variation in the behavior of the laser cavity, i.e. especially its gain, or light amplification, varies.

Figure 5A:
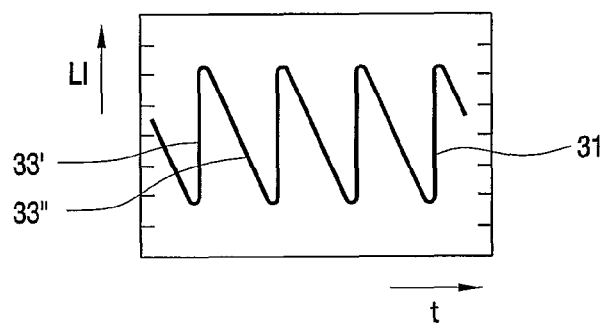
FIG. 5 illustrates the variation of the optical frequency and of the gain of the laser cavity as a function of the movement of the sheet.

FIG. 5a shows the variation of the laser beam intensity LI as a function of time t in case the movement of the sheet has a component in the direction of the chief ray of the laser beam towards the diode laser. Both LI and t are in arbitrary units. As the variation of the laser intensity is proportional to the variation of the laser gain g, which is determined by the variation of the frequency ν, and as the time axis can be re-scaled in an axis which represents the distance $L_0$ between the sheet to the diode laser, the graph 31 of FIG. 5a is similar to a graph representing the variation in the laser gain as a function of the distance $L_0$. The gain variation $\Delta g$ as a function of the velocity $\upsilon$ of the object is given by the following equation:

$$\Delta g = \frac{K}{L} \cdot \cos \cdot \left\{ \frac{4\pi\upsilon \cdot v \cdot t}{c} + \frac{4\pi\upsilon \cdot L_0 \cdot t}{c} \right\}$$

In this equation:

K is the coupling coefficient to the external cavity; it is indicative of the quantity of radiation coupled out of the laser cavity;

v is the frequency of the laser radiation;

$\upsilon$ is the velocity of the sheet in the direction of the illumination beam;

t is the moment of time, and c is the light velocity.

The equation can be derived from the theory on the self-mixing effect disclosed in the two articles mentioned herein above. The sheet is moved in its own plane, as is indicated by the arrow 16 in FIG. 4. Because the Doppler shift occurs only for a sheet movement in the direction of the beam, this movement 16 should be such that it has a component 16' in this direction. Thereby, it becomes possible to measure the movement in a XZ plane, i.e. the plane of drawing of FIG. 4 which movement can be called the X movement. FIG. 4 shows that the sheet has a skew position with respect to the rest of the system. In practice, and as shown in FIG. 4, usually the measuring beam is a skew beam and the movement of the sheet will take plane in a XY-plane. The Y-direction is perpendicular to the plane of the drawing in FIG. 4. If necessary the movement in this direction can be measured by a second measuring beam, emitted by a second diode laser, and scattered light of which is captured by a second photo diode associated with the second diode laser.

The measuring method requires only a small Doppler shift, for example in terms of wavelength, a shift of the order of $1.5 \cdot 10^{-6}$ m, which corresponds to a Doppler frequency shift of the order of 100 kHz for a laser wavelength of 680 nm.

Measuring the variation of the laser cavity gain caused by the object movement by measuring the intensity of the radiation at the rear laser facet by a monitor diode is the simplest, and thus the most attractive way. Conventionally, this diode is used for keeping the intensity of the laser radiation constant, but now it is also used for measuring the movement of the object.

Figure 6:
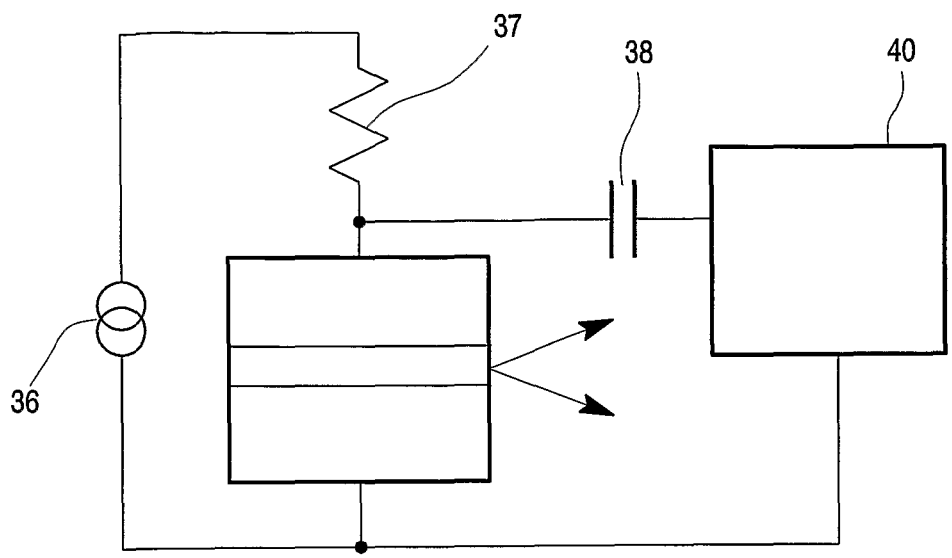
FIG. 6 illustrates schematically a method of measuring the variation referred to in relation to FIG. 5.

Another method of measuring the gain variation, and thus the movement of the sheet, makes use of the fact that the intensity of the laser radiation is proportional to the number of electrons in the conduction band in the junction of the laser. This number in turn is inversely proportional to the resistance of the junction. By measuring this resistance, the movement of the object can be determined. An embodiment of this measuring method is illustrated in FIG. 6. In this figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms high impedance for the signal across the diode laser.

Besides the velocity of the sheet movement also the amount of movement, i.e. the sheet position, can be determined, by integrating the measured velocity with respect to time. For such integration information about the direction of movement is needed, i.e. it has to be determined whether the sheet moves forward or backward along an axis of measurement. The number of periods within a time interval of the signal 31 obtained by the sensor embodiment of FIG. 3 provides information about the velocity of the movement, but no information about the direction of movement. However, when using this embodiment the information about the direction can be derived from the paper transport controller 10. In this controller, which controls the sheet feed motor driving the roller 14, the direction information is available.

Figure 5B:
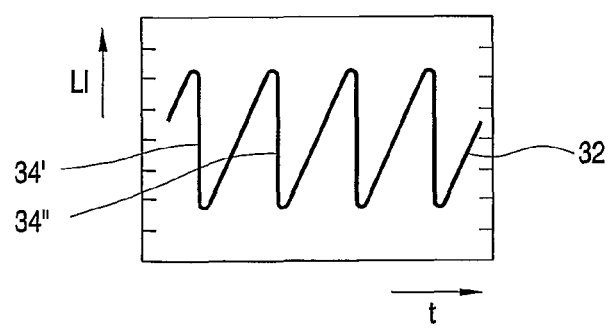

According to a further aspect of the invention, the direction of movement can be detected by determining the shape of the signal resulting from the self-mixing effect. As shown by graph 31 in FIG. 5*a*, this signal is an asymmetric signal. The graph 31 represents the situation where the sheet movement has a component towards the laser. The rising slope 33' of the graph 31 is steeper than the falling slope 33". As described in the above-mentioned article in Applied Optics, Vol. 31, No. 8, 20 Jun. 1992, pages 3401-3408, the asymmetry is reversed for a movement of the object away from the laser. This is illustrated by graph 32 in FIG. 5*b*, which represents the situation that the sheet movement has a component away from the diode laser. The falling slope 34" of graph 32 is steeper than its rising slope 34'. By determining the type of asymmetry of the self-mixing signal, for example by comparing it with a reference, the direction of movement of the sheet can be ascertained.

Figure 7A:
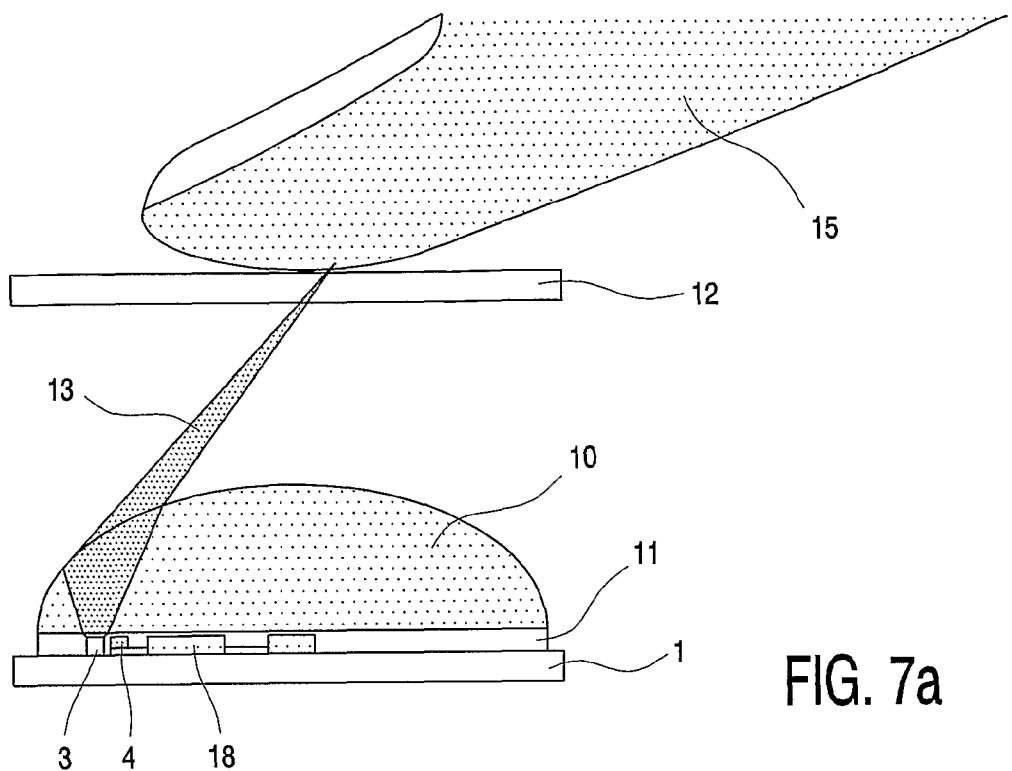
FIG. 7a is a schematic cross-sectional view of a self-mixing optical input device.

FIG. 7*a* is a diagrammatic cross-section of an input device such as that described in International Patent Application WO02/37410. The device comprises at its lower side a base plate 1, which is a carrier for the diode lasers, in this embodiment lasers of the type VCSEL, and the detectors, for example photo diodes. In FIG. 7*a* only one diode laser 3 and its associated photo diode 4 is visible, but usually at least a second diode laser 5 and associated detector 6 is provided on the base plate, as shown in the FIG. 7*b* top view of the apparatus. The diode lasers 3 and 5 emit laser, or measuring, beams 13 and 17, respectively. At its upper side the device is provided with a transparent window 12 across which an object 15, for example a human finger is to be moved. A lens 10, for example a plano-convex lens is arranged between the diode lasers and the window. This lens focuses the laser beams 13 and 17 at or near the upper side of the transparent window. If an object 15 is present at this position, it scatters the beam 13. A part of the radiation of beam 13 is scattered in the direction of the illumination beam 13 and this part is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which converts the radiation variation into an electric signal, and an electronic circuitry 18 for processing this signal. The illumination beam 17 is also focused on the object, scattered thereby and part of the scattered radiation re-enters the cavity of the diode laser 5. The circuitry 18 and 19, for the signal of the photo diode 6, shown in FIGS. 7*a* and 7*b* has only an illustrative purpose and may be more or less conventional. As is illustrated in FIG. 7*b*, this circuitry is interconnected.

Figure 7B:
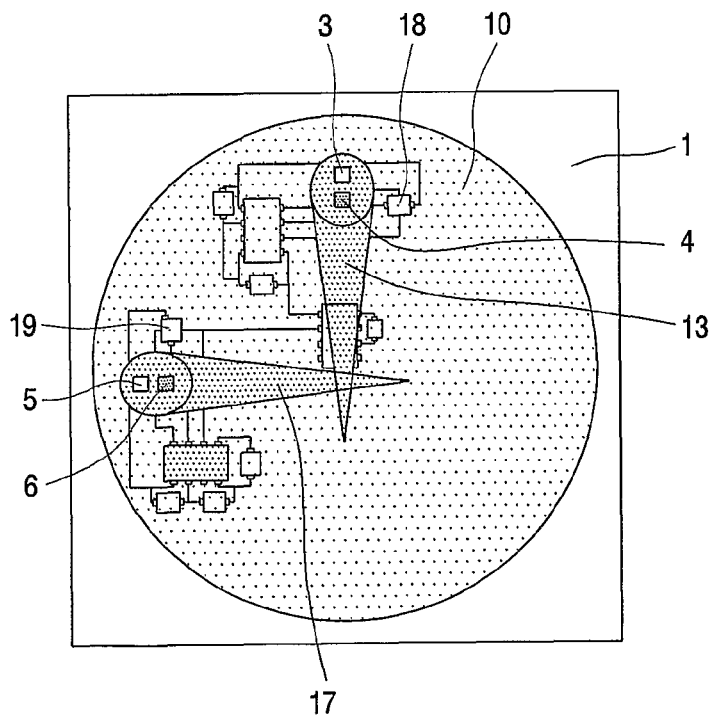

The principles of the measuring method used in a device such as that of FIGS. 7*a* and 7*b* are the same as those described with reference to FIGS. 4 to 6, and will not be repeated here.

As explained above, in the case of these and other types of prior art self-mixing devices, measurement is not necessarily precise since the resultant signal level is of varying amplitude and laser and electronic noise cannot be separated from the signal perfectly. In order to achieve a very high precision in this regard, it is known to employ a method in which the exact frequency is measured using a spectrum analyzer, as opposed to counting pulses. However, this solution is not only expensive due to the significantly higher electrical effort, but it is also bulky and has a relatively low response speed.

Another known method for improving precision in self-mixing sensors involves stabilization of the laser mode. For example, in U.S. Pat. No. 6,233,045, the device is configured to avoid mode hopping, possibly by providing for relatively high loss for all modes other than the desired mode. This may be accomplished by utilizing laser types that have a high degree of side-mode suppression, such as DFB lasers or through active or passive control of the amount of light permitted to re-enter the laser. However, solution also has the disadvantage that it is expensive due to the need for additional optical elements that need to be aligned to the laser beam. It also consumes additional space, which may be scarce, particularly in printer and copier applications.

Figure 1:
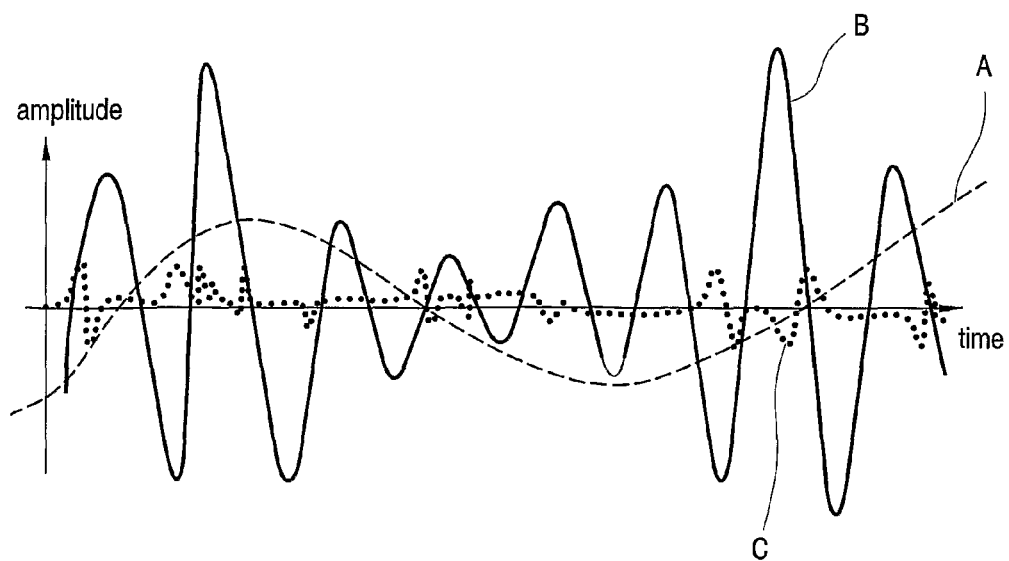
FIG. 1 illustrates the individual components of a first electric signal including a laser self-mixing signal B due to displacement of an object in the laser focus with a constant velocity, laser and electronic low frequency noise A, and high frequency noise C.
Figure 2:
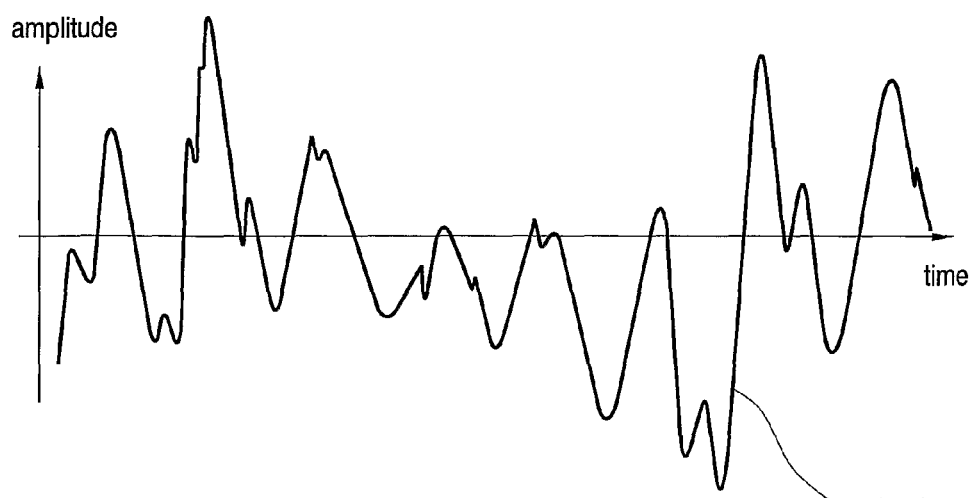
FIG. 2 illustrates schematically the resultant first electric signal of FIG. 1 when all of the components thereof are mixed.
Figure 8:
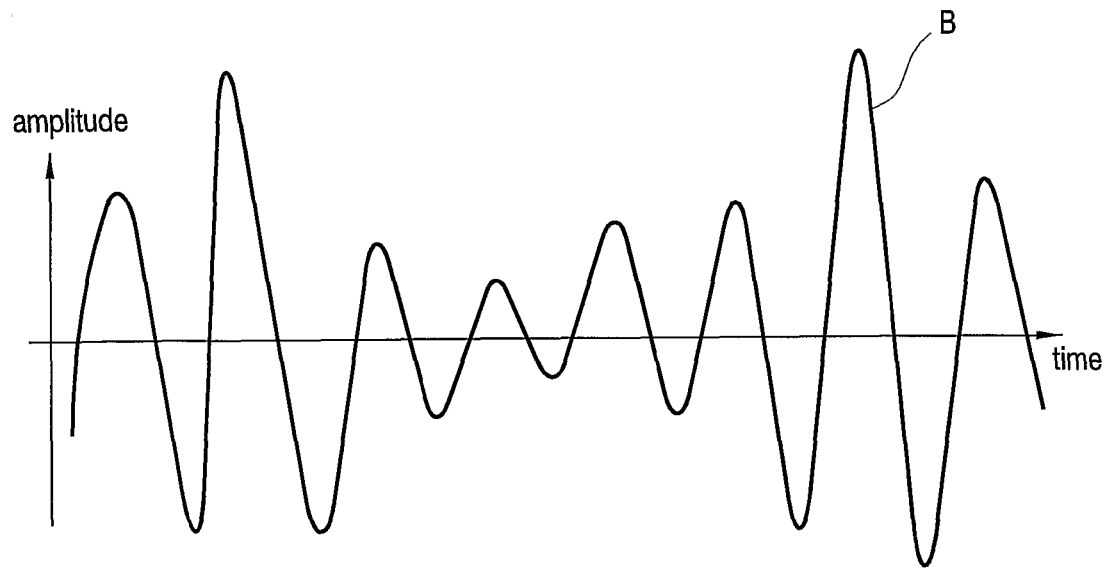
FIG. 8 illustrates a laser self-mixing signal after band-pass filtering.

The present invention proposes the provision of a band pass filter to filter the laser self-mixing signal of (say) FIG. 2 of the drawings (prior to signal processing thereof) to at least reduce the low and high frequency components thereof, and resulting in a filtered signal such as that illustrated in FIG. 8 of the drawings such that the precision of laser self-mixing translation measurements is significantly improved. In other words, using a band pass filter that allows only the information signal B to pass (and a very small fraction of noise that has, by chance, the same frequency as the signal), the signal can be recovered to a nice state that allows for the pulse counting technique described above.

It will be appreciated that the principle of the present invention can be used in many different types of application including a relative movement sensor which operates on the basis of the above-mentioned self-mixing effect in a laser cavity, including a sheet sensor and apparatus for processing sheet material of the type described in International Patent Application No. WO 02/37124, an input device of the type described in International Patent Application No. WO 02/37410, as well as in the precise rotational or translational speed control in industrial machines.

In the case of some applications, the velocity of relative movement may be relatively constant, or it may, for example, be controlled by a motor controller, in which case the motor controller could be arranged and configured to control not only the motor velocity but also the low and high pass components constituting the pass band of the band pass filter.

Figure 9:
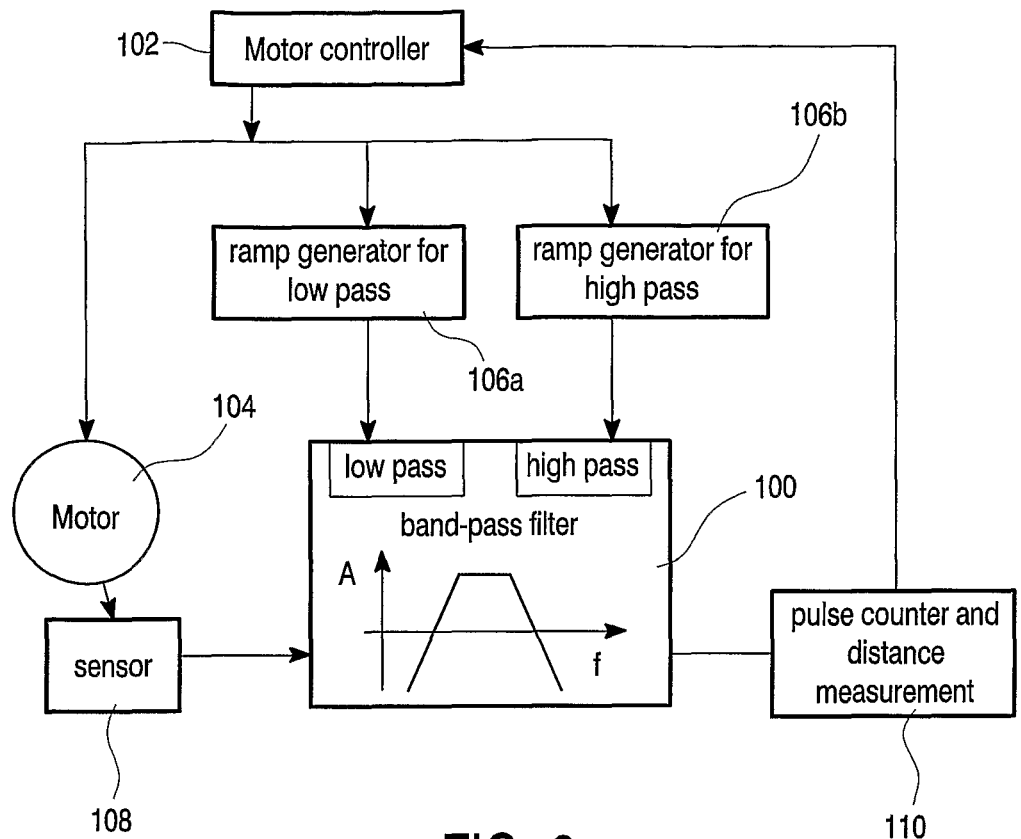
FIG. 9 is a schematic block diagram illustrating apparatus according to an exemplary embodiment of the present invention as part of a closed motor control loop.
Figure 10:
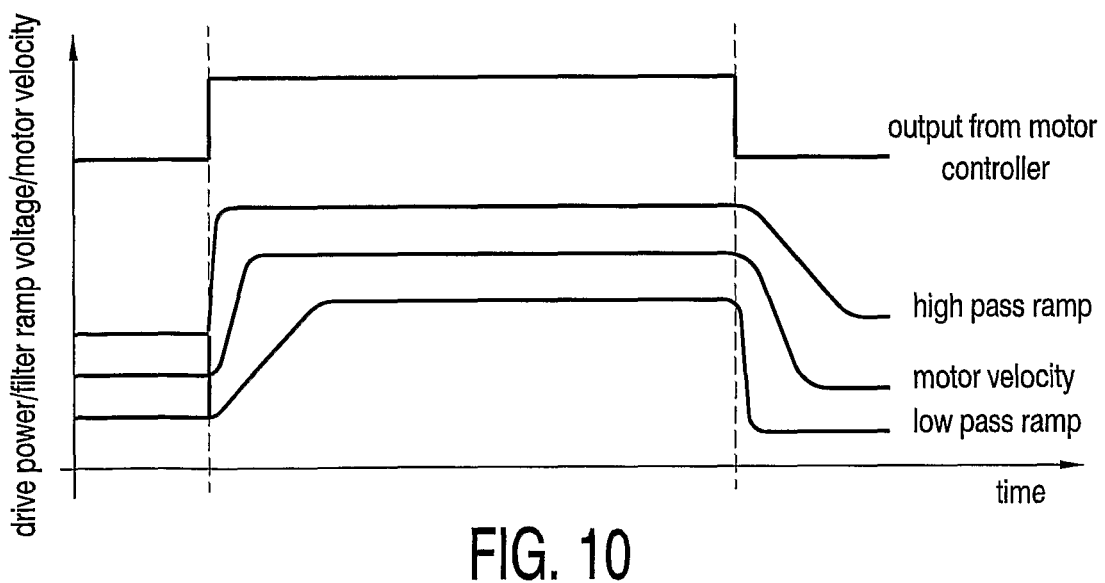
FIG. 10 is a graphical illustration of some exemplary voltage and motor velocity timings in respect of the apparatus of FIG. 9.

Referring to FIG. 9 of the drawings, one of the simplest conceivable embodiments of the present invention employs a controllable band pass filter 100 that is controlled by a motor controller 102 in, for example, a machine such as a copier or printer. Since the motor speed changes might be faster than the control signals from the motor controller 102, a preferred design for printers consists of a motor controller 102 that gives a signal before or at the same moment when the motor 104 is started and a signal when the motor 104 is stopped. Electronic signal processing circuitry 106a, 106b generates ramps according to the expected mechanical behavior of the motor 104 that controls the band pass filter 100. Thus, a feedback loop is provided from the motor 104 and relative movement sensor 108, via the pulse counter 110 back to the motor controller 102 which controls the motor 104, and the various timing diagrams of the arrangement of FIG. 9 are illustrated graphically in FIG. 10 of the drawings.

In another, more complex, embodiment, the pass band of the band pass filter may be controlled by the back-emf of the motor 104 or another parameter representative of motor velocity.

Figure 11:
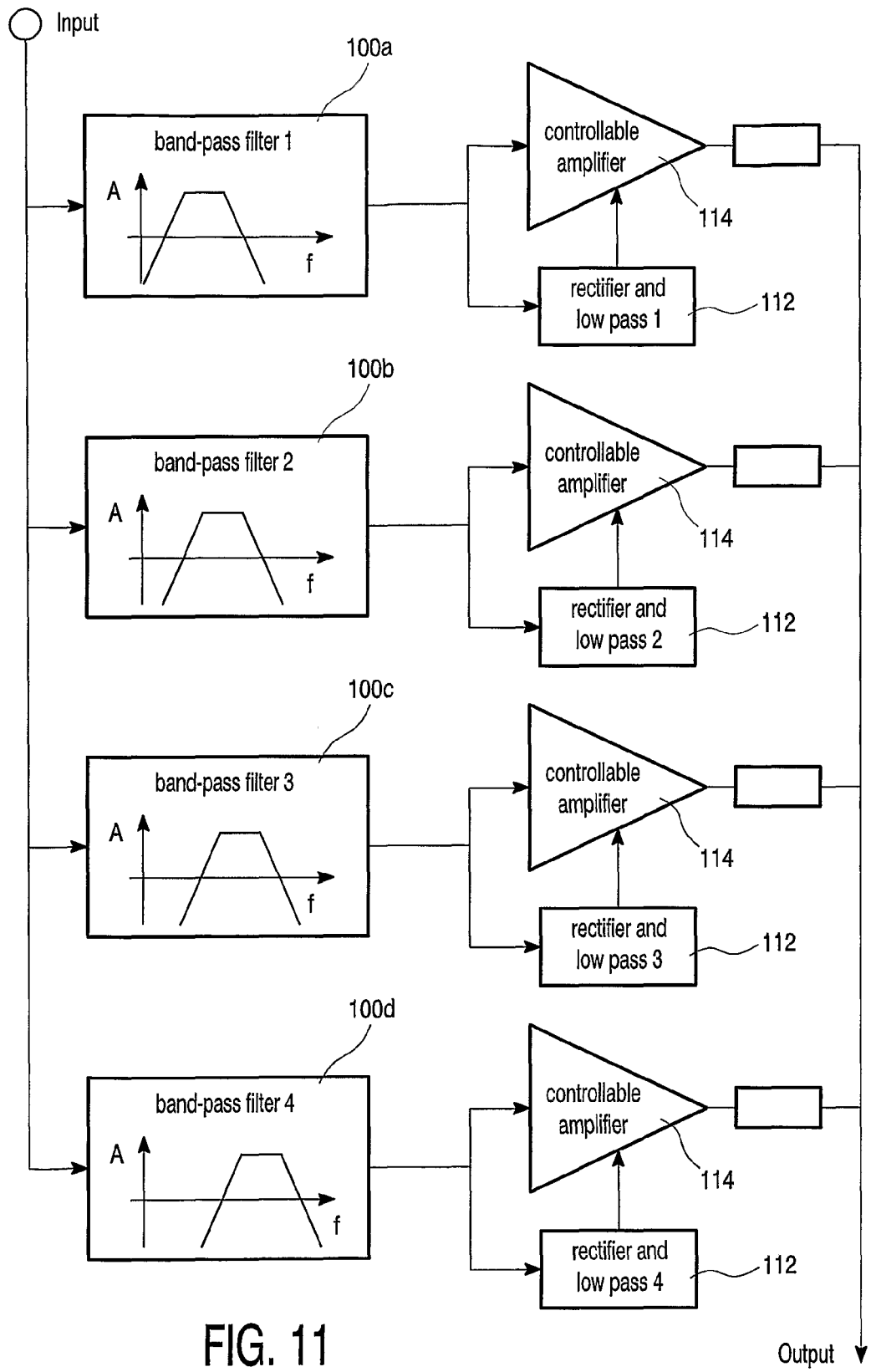
FIG. 11 is a schematic block diagram of apparatus according to a second exemplary embodiment of the present invention in which no external control is necessary.

Referring to FIG. 11 of the drawings, in another exemplary embodiment of the present invention, the band pass filter 100 used to filter information signal is dependent on the frequency of the signal. If the information signal is of a sufficiently good quality, the correct band pass filter 100 is selected automatically. In the example illustrated, each of the band pass filters 100a-d has associated therewith a respective rectifier 112 and controllable amplifier 114. The input signal which has passed through the correct band pass filter 100a (say) according to its frequency is relatively greatly amplified, and the resultant signal is mixed with less-amplified input signals which have passed through the other band pass filters 100b-d.

If the symmetry of the signal (for example, a laser Doppler frequency that indicates the motor velocity) is used in the signal processing, higher order harmonics of the Doppler frequency are of importance. Thus, it is preferred that the filter be designed not to filter these frequencies out. This can be achieved by keeping the band pass sufficiently broad to allow at least one higher order to pass. Alternatively, complex band pass filters can be used that allow the Doppler frequency and one or more respective higher orders to pass.

Figure 12:
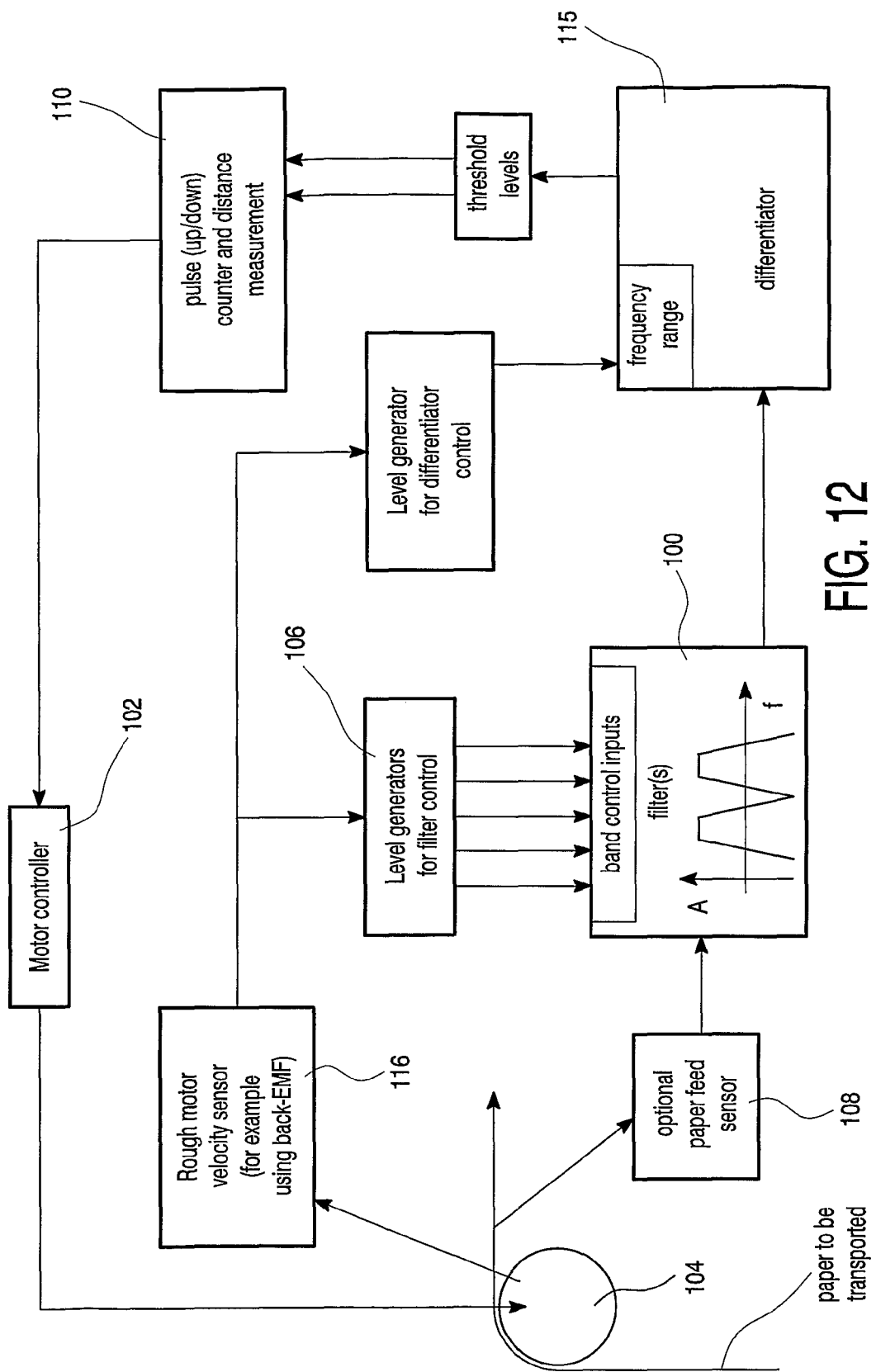
FIG. 12 is a schematic block diagram of apparatus according to a third exemplary embodiment of the present invention as part of a closed motor control loop of a printer or copying machine using a laser self-mixing paper feed sensor.

The detection of symmetry of a Doppler signal (as generated by laser self-mixing) is generally done by differentiation. High frequency signals have a larger amplitude when differentiated. In order to keep the output of the differentiator 115 more constant over different frequencies, the information of the approximate measured velocity or frequency can be used to control the differentiator's time constant, output amplitude or a variable amplification before or after the differentiator. This can be achieved in the device of FIG. 9 by generating a slope that represents the approximate expected motor velocity to control the differentiator or controllable amplifier. A very simple sensor 116 for the approximate motor velocity is, for example, based on the measurement of the back-electromagnetic force (back-EMF), and an advanced system based on this principle is illustrated in FIG. 12 of the drawings.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A relative movement sensor for measuring movement of an object and said sensor relative to each other, the sensor comprising:

at least one laser, having a laser cavity, for generating a measuring beam and illuminating an object therewith, wherein at least some of the measuring beam radiation reflected by said object re-enters said laser cavity;

measuring means for measuring changes in operation of said laser cavity caused by interference of reflected measuring beam radiation re-entering said laser cavity and the optical wave in said laser cavity;

means for providing a first electric signal representative of said changes;

band pass filter means for filtering said first electric signal so as to at least reduce the contribution thereto by low and high frequency noise to produce a second electric signal representative of said changes for use in determining relative movement of said object and said sensor; and a motor configured to effect said relative movement, wherein a pass band of the band pass filter means is set and dynamically changed and controlled in accordance with a speed of said motor.

2. A sensor according to claim 1, wherein the low and high pass components of the pass band of the band pass filter are created by ramp generators.

3. A sensor according to claim 2, wherein the ramp generators are arranged to receive one or more control signals from a motor controller, which controls a motor, such that the slope of the ramps generated by the ramp generators, and therefore the pass band of the band pass filter is controlled dependent on the speed of the motor.

4. A sensor according to claim 3, wherein a pulse counter is used to determine from the second electric signal at least the extent of relative movement between the object and the sensor, and a feedback loop is provided from the pulse counter to the motor and the sensor, via the motor.

5. A sensor according to claim 2, wherein a motor velocity sensor is provided to sense the velocity of the motor and provide control signals to level generator means for generating the low and high pass components of the pass band filter.

6. A sensor according to claim 5, wherein a differentiator is provided between the band pass filter and the pulse counter and level generator means are provided for control of the differentiator.

7. A sensor according to claim 6, wherein the level generator receives an input from the motor velocity sensor.

8. A sensor according to claim 1, comprising a plurality of band pass filters, one of which is selected dependent upon the frequency of the first electric signal.

9. A sensor according to claim 8, wherein each of the band pass filters is provided with a respective rectifier and amplifier.

10. A sensor according to claim 1, wherein said band pass filter means is arranged and configured to allow at least one higher order harmonic of said first electric signal to pass.

11. A sensor according to claim 1, wherein the pass band of the band pass filter is determined by the expected or actual frequency of undulation of the first electric signal, the main dependent parameter of which is the highest speed of relative movement required to be detected.

12. A sensor according to claim 1, wherein the pass band of the band pass filter is fixed.

13. A sensor according to claim 1, wherein the pass band of the band pass filter means is controllable.

14. A method for measuring movement of an object and a sensor relative to each other, the sensor comprising at least one laser, having a laser cavity, for generating a measuring beam and illuminating an object therewith, wherein at least some of the measuring beam radiation reflected by said object re-enters said laser cavity, the method further comprising:

measuring changes in operation of said laser cavity caused by interference of reflected measuring beam radiation re-entering said laser cavity and the optical wave in said laser cavity;

providing a first electric signal representative of said changes; and filtering said first electric signal so as to at least reduce the contribution thereto by low and high frequency noise to produce a second electric signal representative of said changes for use in determining relative movement of said object and said sensor, wherein the relative movement is effectuated by a motor, and wherein the filtering is set and dynamically changed and controlled in accordance with a speed of said motor.

* * * * *